No. 649,735. Patented May 15, 1900.
H. LENLING.
FIVE HORSE DRAFT EQUALIZER.
(Application filed Mar. 16, 1900.)
(No Model.)
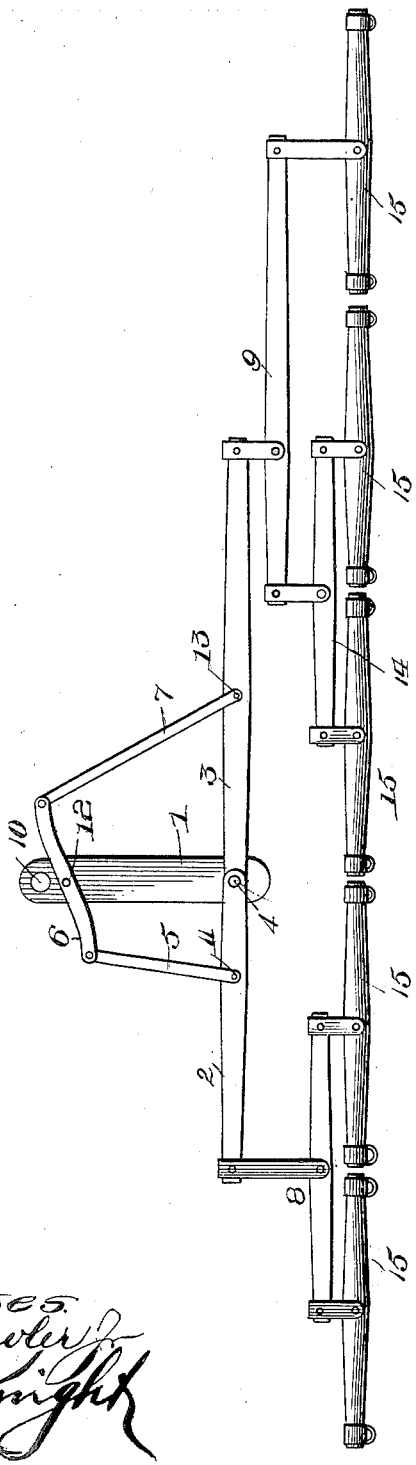
Witnesses
J. M. Fowler
H. U. Knight
Inventor
Henry Lenling
By Knight Bros
Attys

UNITED STATES PATENT OFFICE.

HENRY LENLING, OF GEM, SOUTH DAKOTA.

FIVE-HORSE DRAFT-EQUALIZER.

SPECIFICATION forming part of Letters Patent No. 649,735, dated May 15, 1900.

Application filed March 16, 1900. Serial No. 8,973. (No model.)

*To all whom it may concern:*

Be it known that I, HENRY LENLING, a citizen of the United States, and a resident of Gem, in the county of Brown and State of South Dakota, have invented certain new and useful Improvements in Five-Horse Equalizing-Eveners, of which the following is a specification.

Draft-equalizers as heretofore constructed have been objectionable in that when employed in connection with gang-plows or the like they cause one or more of the horses to walk upon plowed ground, which not only places the animal at a disadvantage, but tramps down the ground. They have also been generally unsatisfactory in that they cause unsteady movement of the implement.

The object of my invention is to provide a five-horse evener which will permit the end horse next the plowed ground to walk in the bottom of the last preceding furrow, so that he travels upon ground approximately as solid as if unplowed, while all the remaining horses have solid unplowed ground to walk upon.

A further object is to provide an evener that will be steady in the draft transmitted to the implement.

To these ends my invention consists in a certain novel arrangement of parts, which will be hereinafter fully described, and particularly pointed out in the claims, reference being had to the accompanying drawing, which represents my improved device in plan.

My improved device comprises a draw-bar 1, short off lever 2, and long near lever 3, oppositely projecting and independent, but having a common fulcrum 4 upon the draw-bar, a transmitting connection 5 6 7 between said levers 2 and 3, a doubletree 8, connected to the end of the short or off lever, and a three-horse evener 9, connected to the end of the long or near lever 3.

The draw-bar 1 may be constructed for attachment at 10 to a clevis or other draft portion of an implement.

The lengths of the levers 2 and 3 are directly proportional to the number of draft-animals to be hitched to each in order that there may be but two animals on the off side of the center line of the implement, while the remainder of the five-horse team will be upon the near side of the center line of the implement. The advantage of this arrangement lies in the fact that the extreme off animal may always walk in the bottom of the near furrow of the preceding gang of furrows, while the remaining horses walk upon unplowed ground, and all therefore have solid foothold for draft, but none walk upon or tread down plowed ground.

In order that each individual animal may have uniform work imposed upon it, the transmitting connection, which consists of rigid bar 5, rocking lever 6, and rigid bar 7, has the bar 5 connected to the short or off lever 2 at a point 11, while the rocking lever 6 is centrally fulcrumed at 12, and the rod 7 is connected to the long or near lever 3 at a point 13, and the distances of the points 11 and 13 from the fulcrum 4 bear such relation to the entire lengths of the levers 2 and 3 as that the ratio of leverage gained at the outer ends of the levers 2 and 3 shall bear the ratio of three to two. Hence since the levers 2 and 3 are independently fulcrumed and reciprocally sustain through the transmitting connections the load imposed upon the horses through the respective levers will be directly proportional to the number intended to be attached to said levers.

The three-horse evener has its long arm extending outward, thus giving further lateral offset and facilitating the required disposition of the horses. At the short end of the evener 9 is mounted a doubletree 14, while at each end of the two doubletrees 8 and 14 and at the end of the long arm of evener 9 is attached a singletree 15.

It will be further observed that the described arrangement of and relations between the parts afford a symmetrical or uniform disposition of the draft-animals and cause the team to work more in unison than if separated into two groups.

I find in practice that a device constructed as above described, in addition to the advantages pointed out in detail, prevents unsteady work of the team.

Having thus described my invention, the following is what I claim as new therein and desire to secure by Letters Patent:

1. A draft-equalizer embodying a suitable draw-bar, levers independently fulcrumed each at one end upon said draw-bar and formed of lengths directly proportional to the number of horses to be attached to them, and a transmitting connection from one to the other, comprising a rocking lever, and connections between the ends of said rocking lever and points in the levers first named that give to the outer ends of said first-named levers leverages inversely proportional to the number of horses to be attached to them.

2. A five-horse equalizer embodying a draw-bar, the off and near levers separately fulcrumed each at its inner end to said draw-bar and provided respectively for attachment of two and three horses thereto, and a connection transmitting motion between said levers, comprising the rocking lever centrally fulcrumed on said draw-bar, and rigid bars connecting the ends of said rocking lever to the off and near levers at points in their lengths, which give the said off and near levers leverages bearing the ratio of three to two, or inversely proportional to the number of horses to be attached to them.

3. In a five-horse evener, the combination of a draw-bar, oppositely-projecting levers proportioned in length as two to three, independently fulcrumed each at one end upon said draw-bar, the connection transmitting motion between said levers with leverages as three to two, a doubletree on the end of the shorter lever, and a three-horse evener, with long arm outward, on the end of the longer lever.

HENRY LENLING.

Witnesses:
FRANK KISLOVER,
WILLIAM ASHLEY.